(12) United States Patent
Simmons et al.

(10) Patent No.: US 9,372,580 B2
(45) Date of Patent: Jun. 21, 2016

(54) ENHANCED TOUCH DETECTION METHODS

(75) Inventors: Martin John Simmons, Southampton (GB); Darren Golbourn, Southampton (GB); Daniel Pickett, Southampton (GB); Andrew Hersee, Southampton (GB)

(73) Assignee: Atmel Corporation, San Jose, CA (US)

( * ) Notice: Subject to any disclaimer, the term of this patent is extended or adjusted under 35 U.S.C. 154(b) by 425 days.

(21) Appl. No.: 13/332,945

(22) Filed: Dec. 21, 2011

(65) Prior Publication Data
US 2013/0162583 A1    Jun. 27, 2013

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0416* (2013.01); *G06F 3/0418* (2013.01); *G06F 2203/04104* (2013.01); *G06F 2203/04112* (2013.01)

(58) Field of Classification Search
CPC ..... G06F 3/044; G06F 3/0416; G06F 3/0418; G06F 2203/04104; G06F 2203/04112
USPC ........................................................ 345/174
See application file for complete search history.

(56) References Cited

U.S. PATENT DOCUMENTS

| 7,663,607 | B2 * | 2/2010 | Hotelling et al. | 345/173 |
|---|---|---|---|---|
| 7,875,814 | B2 | 1/2011 | Chen | |
| 7,920,129 | B2 | 4/2011 | Hotelling | |
| 8,031,094 | B2 | 10/2011 | Hotelling | |
| 8,031,174 | B2 | 10/2011 | Hamblin | |
| 8,040,326 | B2 | 10/2011 | Hotelling | |
| 8,049,732 | B2 | 11/2011 | Hotelling | |
| 8,179,381 | B2 | 5/2012 | Frey | |
| 8,462,135 | B1 * | 6/2013 | Xiao et al. | 345/174 |
| 8,482,544 | B2 * | 7/2013 | Land et al. | 345/174 |
| 8,692,795 | B1 * | 4/2014 | Kremin et al. | 345/174 |
| 8,773,146 | B1 * | 7/2014 | Hills et al. | 324/658 |
| 8,810,544 | B2 * | 8/2014 | Liu et al. | 345/174 |
| 2009/0315854 | A1 | 12/2009 | Matsuo | |
| 2010/0001966 | A1 * | 1/2010 | Lii et al. | 345/173 |
| 2012/0049869 | A1 * | 3/2012 | Kremin et al. | 324/679 |
| 2012/0206407 | A1 * | 8/2012 | Taylor et al. | 345/174 |

(Continued)

FOREIGN PATENT DOCUMENTS

WO    WO 2012/129247    9/2012

OTHER PUBLICATIONS

U.S. Appl. No. 61/454,936, filed Mar. 21, 2011, Myers.

(Continued)

*Primary Examiner* — Aneeta Yodichkas
*Assistant Examiner* — Joseph Fox
(74) *Attorney, Agent, or Firm* — Baker Botts L.L.P.

(57) ABSTRACT

In one embodiment, a method includes sending a first set of signals to a first set of lines of a touch sensor. The method also includes receiving a second set of signals on a second set of lines of the touch sensor in response to sending the first set of signals. The second set of lines are capacitively coupled to the first set of lines. The method includes sending a third set of signals and receiving a fourth set of signals. The fourth set of signals is capacitively generated based on the third set of signals. The method also includes determining a fifth set of signals by compensating the second set of signals based on the fourth set of signals and determining whether a touch occurred based on the fifth set of signals.

12 Claims, 3 Drawing Sheets

(56) References Cited

U.S. PATENT DOCUMENTS

| | | |
|---|---|---|
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |

OTHER PUBLICATIONS

U.S. Appl. No. 61/454,950, filed Mar. 21, 2011, Lynch.
U.S. Appl. No. 61/454,894, filed Mar. 21, 2011, Rothkopf.

* cited by examiner

ENHANCED TOUCH DETECTION METHODS

BACKGROUND

A touch sensor may detect the presence and location of a touch or the proximity of an object (such as a user's finger or a stylus) within a touch-sensitive area of the touch sensor overlaid on a display screen, for example. In a touch sensitive display application, the touch position sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch position sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

Poor coupling between a user of a device and the device itself may lead to inaccurate measurements and cause actual touches to be missed or inaccurately reported. Effects caused by poor coupling between the user and the device may be referred to as free space effects. One such example is retransmission of drive signal from a drive line on which one touch is present to a sense line on which another touch is present (or when the same touch is present on multiple sense lines and/or multiple drive lines, e.g., when the device is touched by a large finger, a palm, or a cheek) when the user is touching two or more nodes simultaneously resulting in an unexpected amount of drive signal coupled to (and measured on) the sense line. The amount may be unexpected when compared to the amount of drive signal coupled to the sense line when only one node is being touched. This may affect the accuracy of touch sensing devices.

BRIEF DESCRIPTION OF THE DRAWINGS

Reference is now made to the following description taken in conjunction with the accompanying drawings, wherein like reference numbers represent like parts and which.

DESCRIPTION OF EXAMPLE EMBODIMENTS

Figure 1A:
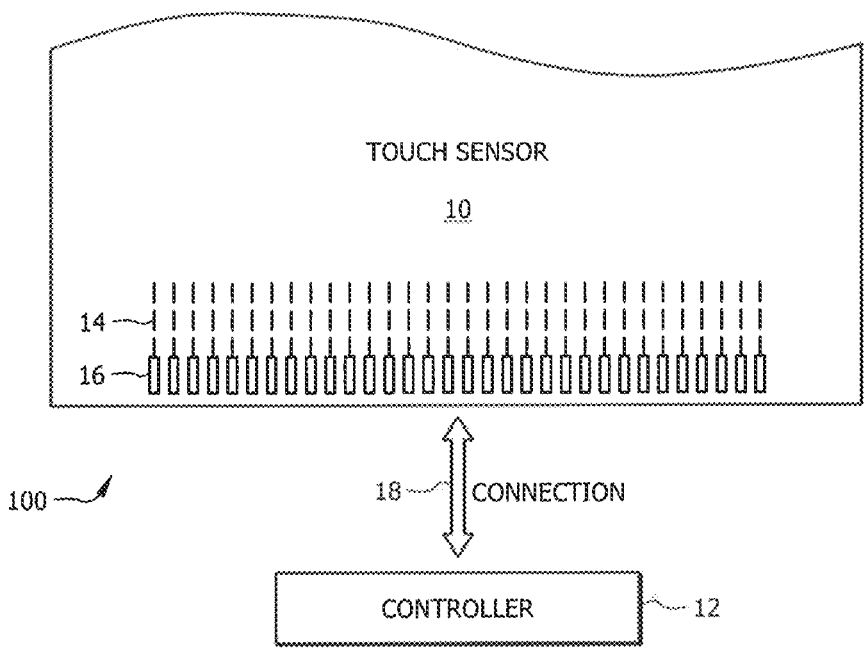
FIG. 1A illustrates an example touch device that includes an example touch sensor with an example controller.

FIG. 1A illustrates an example touch device 100 that includes an example touch sensor 10 with an example touch-sensor controller 12. Touch sensor 10 and touch-sensor controller 12 may detect the presence and location of a touch or the proximity of an object within a touch-sensitive area of touch sensor 10. Touch-sensor controller 12 may be configured to accurately detect touches by sending multiple types of signals to touch sensor 10 and analyzing signals sent by touch sensor 10 in response. This may be advantageous in that touch-sensor controller 12 may be able to detect accurate touches even in the presence of free space effects such as retransmission and various grounding environments (discussed further below with respect to FIGS. 1B and 1C).

Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of electrodes disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, references to FLM encompasses such material, where appropriate. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fill percentages having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the electrodes. The mechanical stack may also include a second layer of OCA and a dielectric layer (which may be made of PET or another suitable material, similar to the substrate with the conductive material forming the electrodes). As an alternative, where appropriate, a thin coating of a dielectric material may be applied instead of the second layer of OCA and the dielectric layer. The second layer of OCA may be disposed between the substrate with the conductive material making up the electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the electrodes in touch sensor 10 may be made of ITO in whole or in part. In particular embodiments, the electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include one or more arrays of electrodes forming an array of capacitive nodes. An electrode aligned in a first axis (e.g., the x-axis) and an electrode aligned in a second axis (e.g., the y-axis) may form a capacitive node. The electrodes forming the capacitive node may come near each other, but not make electrical contact with each other. Instead, the electrodes may be capacitively coupled to each other across a space between them. A pulsed or alternating voltage applied to one electrode (by touch-sensor controller 12) may induce a charge on the other electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more electrodes may together form one or more lines running horizontally, vertically, and/or in any suitable orientation. In particular embodiments, some lines may run substantially perpendicular to other lines. Herein, reference to a line may encompass one or more electrodes making up the line, and vice versa, where appropriate.

Touch sensor 10 may have electrodes disposed in a pattern on one side of a single substrate. In such a configuration, a pair of electrodes capacitively coupled to each other across a space between them may form a capacitive node. For a self-capacitance implementation, electrodes may be disposed in a pattern on a single substrate. In addition or as an alternative to having electrodes disposed in a pattern on one side of a single substrate, touch sensor 10 may have some electrodes (e.g., electrodes aligned in the x-axis) disposed in a pattern on one side of a substrate and other electrodes (e.g., electrodes aligned in the y-axis) disposed in a pattern on another side of the substrate. Moreover, touch sensor 10 may have some electrodes (e.g., electrodes aligned in the x-axis) disposed in a pattern on one side of one substrate and other electrodes (e.g., electrodes aligned in the y-axis) disposed in a pattern on one side of another substrate. In such configurations, an intersection of electrodes may form a capacitive node. Such an intersection may be a location where the electrodes "cross" or come nearest each other in their respective planes. The electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to electrodes of touch sensor 10. The sense unit may sense charge at the capacitive nodes of touch sensor 10 and provide measurement signals to the processor unit representing capacitances at the capacitive nodes. The processor unit may control the supply of drive signals to the electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. In some embodiments, touch-sensor controller 12 may be configured to drive signals to and receive signals from all electrodes (whether they are considered "drive" or "sense" electrodes) of touch sensor 10. Touch-sensor controller 12 may be configured to cause any electrode of touch sensor 10 to be grounded or to be floating with respect to device 100. The storage unit may store programming for execution by the processor unit, including programming for controlling the drive unit to supply drive signals to the electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to electrodes of touch sensor 10, through which the drive unit of touch-sensor controller 12 may supply drive signals to the electrodes. Other tracks 14 may provide sense connections for coupling touch-sensor controller 12 to electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 1B:
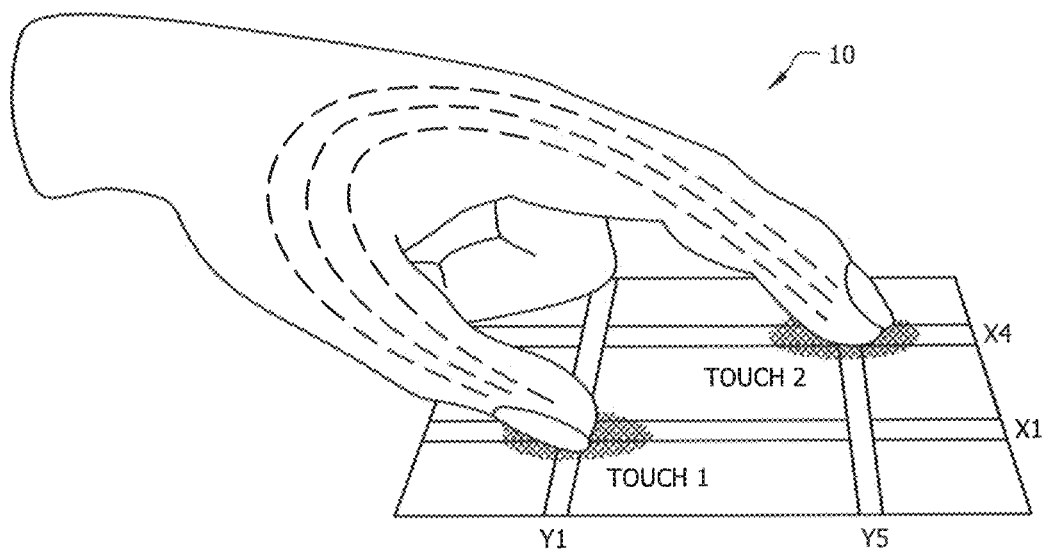
FIG. 1B illustrates use of a touch sensor of FIG. 1A that introduces retransmission effects.

FIG. 1B illustrates use of touch sensor 10 that introduces retransmission effects. Such effects may occur due to a touch on touch sensor 10 by one or more objects (e.g., a stylus and/or a human finger) that are weakly coupled to the ground of touch sensor 10. As discussed above, when touch-sensor controller 12 detects touches using mutual capacitance, touch-sensor controller 12 may sequentially send signals on lines in one axis (e.g., lines X1 and X4) and receive signals on lines in another axis (e.g., lines Y1 and Y5). Touch-sensor controller 12 may use the timing of the sequentially driven lines to determine coordinates of a touch. For example, when line X4 is driven, touch-sensor controller 12 may receive signals indicating a touch on line Y5. Because touch-sensor controller 12 knows when line X4 is driven, touch-sensor controller 12 may determine the coordinates of the touch sensed on line Y5 by examining the time when signals were received from line Y5. A retransmission effect may occur, though, as depicted in FIG. 1B. For example, a user may touch touch sensor 10 in two locations such that one finger is on lines X4 and Y5 and another finger on lines X1 and Y1. As another example, a touch by an object with a relatively large surface area (e.g., the palm of a human hand) may cause a touch at multiple locations. A drive signal sent on line X1 may be transmitted to line Y5 through the user's hand. This may result in line Y5 receiving more charge as a result of line X1 being driven than would have otherwise occurred. If a touch was present at the intersection of lines X1 and Y5 as well (which is not depicted in FIG. 1B), touch-sensor controller 12 may not detect such a touch as a result of the extra charge line Y5 received through the user's hand while line X1 was driven. A drive signal may be sent on line X4 at a different time then was sent on line X1. Charge may be transferred to line Y1 through the user's hand as a result of line X4 being driven. This may result in line Y1 receiving more charge as a result of line X4 being driven than would have otherwise occurred. If a touch was present at the intersection of lines X4 and Y1 as well (which is not depicted in FIG. 1B), touch-sensor controller 12 may not detect such a touch as a result of the extra charge line Y1 received through the user's hand while line X4 was driven. To prevent problems that occur with retransmission, touch-sensor controller 12 may be configured to perform one or more of the techniques discussed below with respect to FIGS. 2-4.

Figure 1C:
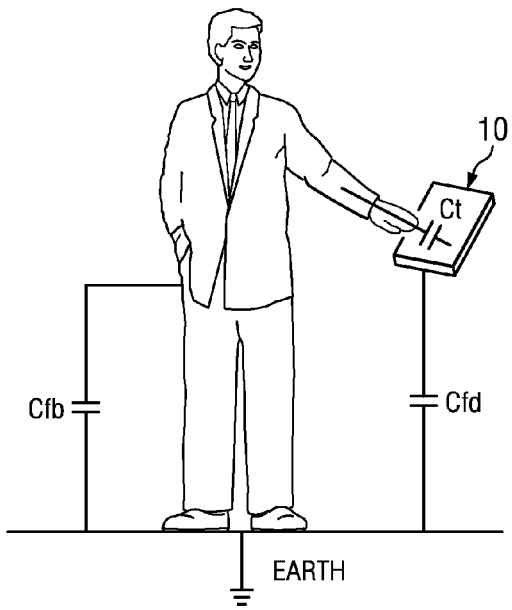
FIG. 1C illustrates multiple ground paths when using the touch device of FIG. 1A.

FIG. 1C illustrates multiple ground paths when using device 100. Capacitance Cfb may be the capacitance between the user and Earth ground. Capacitance Cfd may be the capacitance between device 100 and Earth ground. Capacitance Ct may be the capacitance between the user and device 100. When device 100 is touched by a user that is weakly coupled to the ground of device 100, capacitances Cfb and/or Cfd may be relatively small. As a result, for example, the magnitude of changes detected by touch sensor 10 as a result of one or more touches may be substantially weakened leading to inaccurate touch detection. To prevent problems that occur with a user being poorly coupled to the electrical ground of device 100, touch-sensor controller 12 may be configured to perform one or more of the techniques discussed below with respect to FIGS. 2-4.

Figure 2:
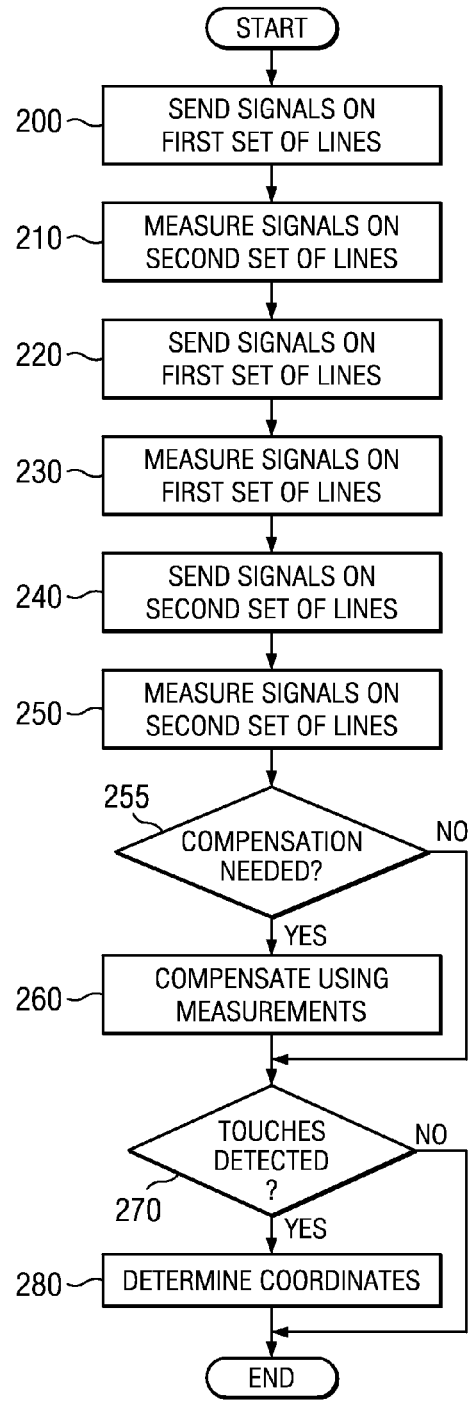
FIG. 2 illustrates an example method for detecting touch input by comparing the effect of transmitted signals between lines of a touch sensor oriented in the same direction.
Figure 3:
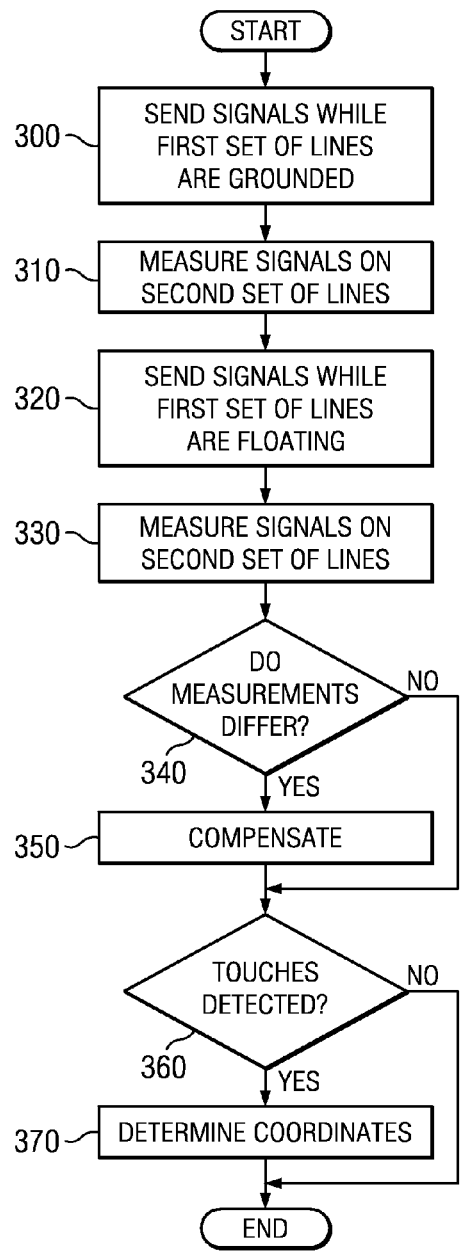
FIG. 3 illustrates an example method for detecting touch input on a device that includes changing one or more lines of a touch sensor to be grounded or floating.
Figure 4:
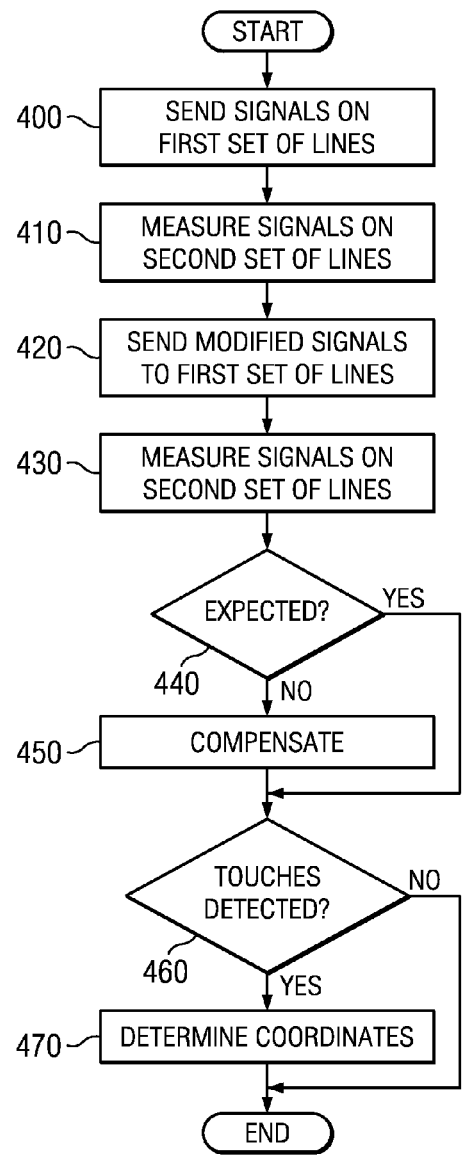
FIG. 4 illustrates an example method for detecting touch input on a device that includes sending different types of signals on one or more lines of a touch sensor.

FIGS. 2-4 illustrate example methods for touch detection techniques that may be employed by a controller (and/or one or more other suitable components) such as touch-sensor controller 12 of FIG. 1. Some embodiments may repeat the steps of the methods of FIGS. 2-4, where appropriate. Moreover, although this disclosure describes and illustrates particular steps of the methods of FIGS. 2-4 as occurring in a particular order, this disclosure contemplates any suitable steps of the methods of FIGS. 2-4 occurring in any suitable order. Furthermore, although this disclosure describes and illustrates particular components, devices, or systems carrying out particular steps of the methods of FIGS. 2-4, this disclosure contemplates any suitable combination of any suitable components, devices, or systems carrying out any suitable steps of any of the methods of FIGS. 2-4.

FIG. 2 illustrates an example method for detecting touch input by comparing the effect of transmitted signals between lines of a touch sensor oriented in the same direction. The method may start at step 200, where signals are transmitted to a first set of lines (e.g., lines oriented along the x-axis). For example, at this step a drive signal may be sent to a set of lines sequentially. Any suitable signal may be sent at this step, such as a step function or a periodic signal. This step may be performed by a controller such as a touch-sensor controller 12 of FIG. 1. The signals and lines mentioned in this step may be implemented using the description above with respect to touch sensor 10 of FIG. 1.

At step 210, in some embodiments, signals may be measured on a second set of lines (e.g., lines oriented along the y-axis). As an example, lines discussed above with respect to touch sensor 10 of FIG. 1 may provide signals to a controller (such as touch-sensor controller 12). The signals measured on the second set of lines may result from the signals sent at step 200 because, for example, the first set of lines may be capacitively coupled to the second set of lines. The signals received at this step may indicate that at least one touch is present on the touch screen because the touch may affect or disturb the capacitive relationship between the first set of lines and the second set of lines.

At step 220, in some embodiments, signals may be sent on the first set of lines (e.g., lines oriented along the x-axis). In some embodiments, each of the first set of lines may be driven sequentially. The same or different signal patterns may be used at this step as in step 200. As an example, the controller may perform this step. In some embodiments, only certain lines of the first set of lines may be driven at this step. For example, only the lines that are associated with lines in the second set of lines that sent signals indicating a touch at step 210 may be driven at step 220.

At step 230, in some embodiments, signals may be measured from the first set of lines (e.g., lines oriented along the x-axis). This may be done while step 220 is being performed and lines of the first set of lines are being driven. For example, one or more lines oriented along the x-axis may be driven sequentially at step 220. At step 230, in this example, measurements on lines oriented along the x-axis are taken while other lines along the x-axis are driven. In some embodiments, one or more of the second set of lines (e.g., lines oriented along the y-axis) may be driven to a fixed potential or floated during steps 220 and/or 230. In some embodiments, this may allow for detection of retransmission effects, as discussed above with respect to FIG. 1B. In some embodiments, steps 220 and 230 may be omitted.

At step 240, in some embodiments, signals may be sent on the second set of lines (e.g., lines oriented along the y-axis). In some embodiments, each of the second set of lines may be driven sequentially. The same or different signal patterns may be used at this step as in step 200. As an example, the controller may perform this step. In some embodiments, only certain lines of the second set of lines may be driven at this step. For example, only the lines that are associated with lines in the second set of lines that sent signals indicating a touch at step 210 may be driven at step 240.

At step 250, in some embodiments, signals may be measured from the second set of lines (e.g., lines oriented along the y-axis). This may be done as the lines implicated at step 240 are driven. For example, one or more lines oriented along the y-axis may be driven sequentially at step 240. At step 250, in this example, measurements on lines oriented along the y-axis are taken while each of the lines are driven. In some embodiments, this may allow for detection of retransmission effects, as discussed above with respect to FIG. 1B. In some embodiments, steps 240 and 250 may be omitted. In some embodiments, steps 240 and 250 may be performed before steps 220 and 230.

At step 255, in some embodiments, it may be determined whether compensation is needed based on the measurements taken at steps 230 and/or 250. If compensation is needed, then step 260 may be performed. If not, then step 270 may be performed. For example, if the values measured at steps 230 and/or 250 are above one or more thresholds, then there may be a need for compensation because this may indicate that retransmission across lines has occurred. This may affect the capacitive relationship between electrodes aligned in a first axis (e.g., the x-axis) and electrodes aligned in a second axis (e.g., the y-axis). Examples of this are discussed above with respect to FIG. 1B. If the values measured at steps 230 and/or 250 are not above one or more thresholds, then this may indicate that compensation is not needed. In some embodiments, the values measured at steps 230 and/or 250 would be very small to nonexistent if retransmission were not occurring. As a result of retransmission, the values measured at steps 230 and/or 250 may be larger and detectable.

At step 260, in some embodiments, compensation may occur with respect to the signals measured at step 210 based on the measurements at steps 230 and/or 250. For example, measurements taken at steps 230 and/or 250 may be used to adjust the values measured at step 210. In some embodiments, this may provide compensation for retransmission effects detected at steps 230 and/or 250. For example, compensation may occur by distributing the measured charge at steps 230 and/or 250 to the measurements taken at step 210. These values may be distributed evenly across implicated nodes.

At step 270, in some embodiments, it may be determined whether one or more touches have been detected. For example, the signals measured at step 210 and modified at step 260 (in situations where step 260 is performed) may be compared to one or more thresholds to determine if a touch has been detected. This process may be iterative in that multiple measurements may be taken, such as by repeating any of steps 200-260. If one or more touches are detected at this step, step 280 may be performed. If not, the method may end. In some embodiments, this may provide for accurately measuring where touches have occurred in the presence of retransmission. For example, this may prevent the failure to detect actual touches due to the effects of retransmission.

At step 280, in some embodiments, coordinates corresponding to one or more touches detected at step 270 may be determined, at which point the method may end. A controller such as touch-sensor controller 12 of FIG. 1 may be used to perform this step. Coordinates of a touch may be determined by correlating signals received on lines with the time such signals were received and when other lines were driven. For example, when a line oriented along the x-axis is driven, the controller may receive signals indicating a touch on a line oriented along the y-axis. Because the controller knows when the line oriented along the x-axis was driven, the controller may determine the coordinates of the touch sensed on the line oriented along the y-axis by examining the time when signals were received from the line oriented along the y-axis. Determining coordinates is only an example of processing that may be done, other suitable processing may be performed at step 280.

FIG. 3 illustrates an example method for detecting touch input on a device that includes changing one or more lines of a touch sensor to be grounded or floating. The method may start at step 300, where one or more lines of a first set of lines (e.g., lines oriented along the x-axis) are driven with one or more signals while other lines in the first set of lines that are not being driven are grounded. For example, at this step a drive signal may be put onto each line of a set of lines oriented along the x-axis sequentially; while each line is being driven, the other lines may be grounded. Any suitable signal may be sent at this step, such as a step function or a periodic signal. This step may be performed by a controller such as a touch-sensor controller 12 of FIG. 1. The signals and lines mentioned in this step may be implemented using the description above with respect to touch sensor 10 of FIG. 1.

At step 310, in some embodiments, signals may be measured on a second set of lines (e.g., lines oriented along the y-axis). The signals measured on the second set of lines may result from the signals sent at step 300 because, for example, the first set of lines may be capacitively coupled to the second set of lines. The signals received at this step may indicate that at least one touch is present on the touch screen because the touch may affect or disturb the capacitive relationship between the first set of lines and the second set of lines.

At step 320, in some embodiments, one or more lines of the first set of lines (e.g., lines oriented along the x-axis) are driven with one or more signals while other lines in the first set of lines that are not being driven are floating. In some embodiments, each of the first set of lines may be driven sequentially and the lines not being driven may be floating instead of grounded. The same or different signal patterns may be used at this step as in step 300. As an example, the controller may perform this step in that it may both drive a line and cause the lines that are not being driven to be floating. In some embodiments, only certain lines of the first set of lines may be driven at this step. For example, only the lines that are associated with lines in the second set of lines that sent signals indicating a touch at step 310 may be driven.

At step 330, in some embodiments, signals may be measured on the second set of lines. As an example, the lines discussed above with respect to touch sensor 10 of FIG. 1 may provide signals to a controller (such as touch-sensor controller 12). The signals measured on the second set of lines may result from the signals sent at step 320 because, for example, the first set of lines may be capacitively coupled to the second set of lines. In some embodiments, steps 320 and 330 may be performed before steps 300 and 310.

At step 340, in some embodiments, the measurements taken at steps 310 and 330 are compared. If there is a difference, then step 350 may be performed. If there is not a difference, then step 360 may be performed. For example, a difference may be determined if the values are not exactly the same or are not within a given range of each other. In some embodiments, by comparing the effect of floating lines that are not being driven, it may be determined whether the capacitive relationship between electrodes aligned in a first axis (e.g., the x-axis) and electrodes aligned in a second axis (e.g., the y-axis) are being affected by free space effects, such as effects caused by a user or object touching the device but not having the same ground as the device or not being substantially coupled to the device. The first set of lines may be a part of the ground path between the user and the device. In situations where the coupling between the user and the device is poor, the ground path through the first set of lines may be a significant part of the total coupling between the user and the device. As a result, detecting differences at step 340 may indicate that the ground path through the first set of lines is a significant part of the total coupling between the user and the device which may indicate that there is poor ground coupling between the user and the device. Examples of this are discussed above with respect to FIG. 1C.

At step 350, in some embodiments, the signals measured at step 310 may be compensated. For example, measurements taken at step 330 may be used to adjust the values measured at step 310. In some embodiments, this may provide compensation for free space effects detected at step 340. For example, compensation may occur by distributing the measured charge at step 330 to the measurements taken at step 310. These values may be distributed evenly across implicated nodes.

At step 360, in some embodiments, it may be determined whether one or more touches have been detected. For example, the signals measured at step 310 and modified at step 350 (in situations where step 350 is performed) may be compared to one or more thresholds to determine if a touch has been detected. This process may be iterative in that multiple measurements may be taken, such as by repeating any of steps 300-350. If one or more touches are detected at this step, step 370 may be performed. If not, the method may end. In some embodiments, this may provide for accurately measuring where touches have occurred in the presence of free space effects such as poor coupling of a user or object touching the device and the device itself. For example, this may prevent the failure to detect actual touches due to the effects of retransmission.

At step 370, in some embodiments, coordinates corresponding to one or more touches detected at step 360 may be determined, at which point the method may end. A controller such as touch-sensor controller 12 of FIG. 1 may be used to perform this step. Coordinates of a touch may be determined by correlating signals received on lines with the time such signals were received and when other lines were driven. For example, when a line oriented along the x-axis is driven, the controller may receive signals indicating a touch on a line oriented along the y-axis. Because the controller knows when the line oriented along the x-axis was driven, the controller may determine the coordinates of the touch sensed on the line oriented along the y-axis by examining the time when signals were received from the line oriented along the y-axis. Determining coordinates is only an example of processing that may be done, other suitable processing may be performed at step 370.

In some embodiments, the method depicted at FIG. 3 may be altered in suitable manners. For example, steps 320 and 330 may be altered such that lines of the second set of lines (e.g., lines oriented along the y-axis) may be floated instead of lines of the first set of lines. As another example, steps may be added, such as floating lines of the second set of lines while lines of the first set of lines are being driven. The results of floating the second set of lines may be compared to the measurements taken at step 310. In some embodiments, this may allow for different or enhanced detection of touches when free space effects are occurring, such as those depicted in FIGS. 1B and 1C.

FIG. 4 illustrates an example method for detecting touch input on a device that includes sending different types of signals on one or more lines of a touch sensor. The method may start at step 400, where signals are transmitted to a first set of lines (e.g., lines oriented along the x-axis). For example, at this step a drive signal may be sent to the first set of lines sequentially. Any suitable signal may be sent at this step, such as a step function or a periodic signal. This step may be performed by a controller such as a touch-sensor controller 12 of FIG. 1. The signals and lines mentioned in this step may be implemented using the description above with respect to touch sensor 10 of FIG. 1.

At step 410, in some embodiments, signals may be measured on a second set of lines (e.g., lines oriented along the y-axis). As an example, the lines discussed above with respect to touch sensor 10 of FIG. 1 may provide signals to a controller (such as touch-sensor controller 12). The signals measured on the second set of lines may result from the signals sent at step 400 because, for example, the first set of lines may be capacitively coupled to the second set of lines. The signals received at this step may indicate that at least one touch is present on the touch screen because the touch may affect or disturb the capacitive relationship between the first set of lines and the second set of lines.

At step 420, in some embodiments, signals may be sent on the first set of lines (e.g., lines oriented along the x-axis). In some embodiments, each of the first set of lines may be driven sequentially with the signals sent at this step. Different signal patterns may be used at this step than in step 400. For example, the signal pattern(s) used at step 400 may be modified at step 420, such as modifying the amplitude, frequency, phase, or other suitable characteristics of the signal pattern. The controller may perform this step. In some embodiments, only certain lines of the first set of lines may be driven at this step. For example, only the lines of the first set of lines that are associated with lines in the second set of lines where signals were detected that indicated a touch at step 410 may be driven at step 420. As another example, two or more of the lines of the first set of lines that are associated with lines in the second set of lines where signals were detected that indicated a touch at step 410 may be driven simultaneously at step 420 with the same or different signal pattern used in step 400.

At step 430, in some embodiments, signals may be measured on the second set of lines (e.g., lines oriented along the y-axis). As an example, the lines discussed above with respect to touch sensor 10 of FIG. 1 that may provide signals to a controller (such as touch-sensor controller 12) may be measured at step 430. The signals measured on the second set of lines may result from the signals sent at step 420 because, for example, the first set of lines may be capacitively coupled to the second set of lines.

At step 440, it is determined whether the signals received at step 430 are expected. The controller may perform this step. In some embodiments, this may indicate whether free space effects (e.g., retransmission or effects due to poor coupling between a user and the device) have occurred. If the signals received at step 430 are expected, it may be determined that free space effects are not affecting the performance of the touch sensor and step 470 may be performed. If the signals received at step 430 are not expected, it may be determined that free space effects are affecting the performance of the touch sensor and step 460 may be performed.

For example, the signals sent at step 420 on the first set of lines may have differed from the signals sent at step 400 by reducing the amplitude by half. At step 440, the signals received at step 430 may be compared to the signals received at step 410 to see if a corresponding change occurred. Characteristics (e.g., slope(s) or intercept(s)) of an approximated line or curve formed by analyzing the signals received at steps 410 and 430 may be compared to expected characteristics based on the signals sent at steps 400 and 420.

As another example, at step 420 the same signals used in step 400 may have been sent to two or more of the first set of lines (e.g., lines oriented along the x-axis) so that there is little to no potential difference between these lines. If the signals received at step 430 are different (given an appropriate level of tolerance) than step 410, then it may be determined that the signals received at step 430 are not expected. In some embodiments, this may indicate that retransmission affected the signals received at step 410 because sending the same signals simultaneously on multiple lines may prevent retransmission between the lines.

At step 450, in some embodiments, the signals measured at step 410 may be compensated. For example, measurements taken at step 430 may be used to adjust the values measured at step 410. In some embodiments, this may provide compensation for free space effects detected at step 440. For example, compensation may occur by distributing the measured charge at step 430 to the measurements taken at step 410. As another example, one or more thresholds related to detecting a touch may be changed (e.g., modifying the one or more thresholds used at step 460). These values may be distributed evenly across implicated nodes. Compensation may vary depending on the types of signals sent on steps 400 and 420. Compensation may vary depending on the type of free space effect detected at step 440.

At step 460, in some embodiments, it may be determined whether one or more touches have been detected. For example, the signals measured at step 410 and modified at step 450 (in situations where step 450 is performed) may be compared to one or more thresholds to determine if a touch has been detected. This process may be iterative in that multiple measurements may be taken, such as by repeating any of steps 400-450 using the same or different signal patterns (e.g., in order to detect different types of effects that may negatively effect detecting touches). If one or more touches are detected at this step, step 470 may be performed. If not, the method may end. In some embodiments, this may provide for accurately measuring where touches have occurred in the presence of free space effects such as poor coupling of a user or object touching the device and the device itself. For example, this may prevent the failure to detect actual touches due to the effects of retransmission.

At step 470, in some embodiments, coordinates corresponding to one or more touches detected at step 460 may be determined, at which point the method may end. A controller such as touch-sensor controller 12 of FIG. 1 may be used to perform this step. Coordinates of a touch may be determined by correlating signals received on the second set of lines (e.g., lines oriented along the y-axis) with the time such signals were received and when the first set of lines (e.g., lines oriented along the x-axis) were driven. For example, when a line oriented along the x-axis is driven, the controller may receive signals indicating a touch on a line oriented along the y-axis. Because the controller knows when the line oriented along the x-axis was driven, the controller may determine the coordinates of the touch sensed on the line oriented along the y-axis by examining the time when signals were received from the line oriented along the y-axis. Determining coordinates is only an example of processing that may be done, other suitable processing may be performed at step 470.

Depending on the specific features implemented, particular embodiments may exhibit some, none, or all of the following technical advantages. A touch sensor may be able to more accurately detect touches. Multiple, simultaneous touches may be detected more accurately. Free space effects that hinder touch sensing may be reduced. Other technical advantages will be readily apparent to one skilled in the art from the preceding figures and description as well as the proceeding claims. Particular embodiments may provide or include all the advantages disclosed, particular embodiments may provide or include only some of the advantages disclosed, and particular embodiments may provide none of the advantages disclosed.

Herein, reference to a computer-readable storage medium encompasses a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable storage medium, or a combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method, performed by executing logic embodied by one or more computer-readable non-transitory storage media, comprising:

sending a first set of signals to a first set of lines of a touch sensor, the first set of lines arranged along a first axis, each line of the first set of lines comprising electrodes;

receiving a second set of signals on a second set of lines of the touch sensor in response to sending the first set of signals, the second set of lines arranged along a second axis that is different than the first axis, each line of the second set of lines comprising electrodes, the second set of lines capacitively coupled to the first set of lines;

in response to receiving the second set of signals, measuring the second set of signals to determine a second set of measured values corresponding to the second set of signals;

storing the second set of measured values corresponding to the second set of signals;

sending a third set of signals to the first set of lines;

determining, after sending the third set of signals to the first set of lines, a fourth set of signals by measuring the first set of lines that received the third set of signals;

in response to measuring the fourth set of signals, determining a fourth set of measured values corresponding to the fourth set of signals;

storing the fourth set of measured values corresponding to the fourth set of signals;

determining a fifth set of signals by compensating the second set of signals based on the fourth set of signals, wherein determining the fifth set of signals comprises adjusting the second set of measured values corresponding to the second set of signals with the fourth set of measured values corresponding to the fourth set of signals; and determining whether a touch occurred based on the fifth set of signals.

2. The method of claim 1 wherein determining the fifth set of signals by compensating the second set of signals based on the fourth set of signals comprises compensating for retransmission in the first set of lines.

3. The method of claim 1, further comprising:

comparing the fourth set of signals to a threshold;

based on comparing the fourth set of signals to the threshold, determining to compensate the second set of signals; and wherein determining the fifth set of signals by compensating the second set of signals based on the fourth set of signals comprises distributing a charge measurement associated with the fourth set of signals to the second set of signals.

4. The method of claim 1, wherein sending the third set of signals to the first set of lines and determining the fourth set of signals occurs after sending the first set of signals to the first set of lines and receiving the second set of signals.

5. A system comprising:

a touch sensor comprising:

a first set of lines, the first set of lines arranged along a first axis, each line of the first set of lines comprising electrodes;

a second set of lines, the second set of lines arranged along a second axis that is different than the first axis, each line of the second set of lines comprising electrodes, the second set of lines capacitively coupled to the first set of lines; and one or more computer-readable non-transitory storage media comprising logic that, when executed is operable to:

send a first set of signals to the first set of lines of the touch sensor;

receive a second set of signals on the second set of lines of the touch sensor in response to sending the first set of signals;

in response to receiving the second set of signals, measure the second set of signals to determine a second set of measured values corresponding to the second set of signals;

store the second set of measured values corresponding to the second set of signals;

send a third set of signals to the first set of lines;

determine, after sending the third set of signals to the first set of lines, a fourth set of signals by measuring the first set of lines that received the third set of signals;

in response to measuring the fourth set of signals, determining a fourth set of measured values corresponding to the fourth set of signals;

store the fourth set of measured values corresponding to the fourth set of signals;

determine a fifth set of signals by compensating the second set of signals based on the fourth set of signals, wherein determining the fifth set of signals comprises adjusting the second set of measured values corresponding to the second set of signals with the fourth set of measured values corresponding to the fourth set of signals; and determine whether a touch occurred based on the fifth set of signals.

6. The system of claim 5 wherein the logic is operable to determine the fifth set of signals by compensating the second set of signals based on the fourth set of signals by compensating for retransmission in the first set of lines.

7. The system of claim 5, wherein:

the logic is further operable to:

compare the fourth set of signals to a threshold;

based on comparing the fourth set of signals to the threshold, determine to compensate the second set of signals; and wherein determining the fifth set of signals by compensating the second set of signals based on the fourth set of signals comprises distributing a charge measurement associated with the fourth set of signals to the second set of signals.

8. The system of claim 5, wherein:

the logic is further operable to:

send the third set of signals to the first set of lines and determine the fourth set of signals after sending the first set of signals to the first set of lines and receiving the second set of signals.

9. One or more computer-readable non-transitory storage media comprising logic that, when executed is operable to:

send a first set of signals to a first set of lines of a touch sensor, the first set of lines arranged along a first axis, each line of the first set of lines comprising electrodes;

receive a second set of signals on a second set of lines of the touch sensor in response to sending the first set of signals, the second set of lines arranged along a second axis that is different than the first axis, each line of the second set of lines comprising electrodes, the second set of lines capacitively coupled to the first set of lines;

in response to receiving the second set of signals, measure the second set of signals to determine a second set of measured values corresponding to the second set of signals;

store the second set of measured values corresponding to the second set of signals;

send a third set of signals to the first set of lines;

determine, after sending the third set of signals to the first set of lines, a fourth set of signals by measuring the first set of lines that received the third set of signals;

in response to measuring the fourth set of signals, determining a fourth set of measured values corresponding to the fourth set of signals;

store the fourth set of measured values corresponding to the fourth set of signals;

determine a fifth set of signals by compensating the second set of signals based on the fourth set of signals, wherein determining the fifth set of signals comprises adjusting the second set of measured values corresponding to the second set of signals with the fourth set of measured values corresponding to the fourth set of signals; and determine whether a touch occurred based on the fifth set of signals.

10. The media of claim 9 wherein the logic is operable to determine the fifth set of signals by compensating the second set of signals based on the fourth set of signals by compensating for retransmission in the first set of lines.

11. The media of claim 9, wherein:

the logic is further operable to:

compare the fourth set of signals to a threshold;

based on comparing the fourth set of signals to the threshold, determine to compensate the second set of signals; and wherein determining the fifth set of signals by compensating the second set of signals based on the fourth set of signals comprises distributing a charge measurement associated with the fourth set of signals to the second set of signals.

12. The media of claim 9, wherein:

the logic is further operable to:

send the third set of signals to the first set of lines and determine the fourth set of signals after sending the first set of signals to the first set of lines and receiving the second set of signals.

\* \* \* \* \*